United States Patent [19]

Martin

[11] Patent Number: 4,567,331
[45] Date of Patent: Jan. 28, 1986

[54] ELECTRONIC HYBRID HAVING SYNTHESIZED IMPEDANCE CIRCUITRY

[75] Inventor: Philip T. Martin, Columbus, Ohio

[73] Assignee: ITT Corporation, New York, N.Y.

[21] Appl. No.: 564,637

[22] Filed: Dec. 22, 1983

[51] Int. Cl.⁴ .............................................. H04M 19/00
[52] U.S. Cl. ................................ 179/170 NC; 179/77
[58] Field of Search ........ 179/170 NC, 170 R, 170 T, 179/77, 16 F, 16 AA

[56] References Cited

U.S. PATENT DOCUMENTS 4,388,500 6/1983 Regan ......................... 179/170 NC

*Primary Examiner*—James L. Dwyer
*Attorney, Agent, or Firm*—John T. O'Halloran; Thomas F. Meagher

[57] ABSTRACT

An electronic hybrid circuit for coupling a two-wire communication path to a four-wire communication path includes amplifier circuits having a reactive feedback path such that the output impedance of each amplifier is approximately zero ohms at d.c. and is a predetermined value at audio frequencies. The amplifiers are arranged to provide battery and voice signal injection on the two-wire path.

11 Claims, 2 Drawing Figures

ELECTRONIC HYBRID HAVING SYNTHESIZED IMPEDANCE CIRCUITRY

BACKGROUND OF THE INVENTION

This invention pertains generally to apparatus for effecting two-to-four wire conversion in communication systems. More particularly, the invention is directed to a subscriber line interface circuit (SLIC) providing electronic hybrid circuitry for interconnecting a two-wire subscriber loop to a four-wire transmission medium while simultaneously providing d.c. battery feed to the subscriber loop.

One typical prior SLIC is taught in U.S. Pat. No. 4,041,252 issued to Earl T. Cowden and assigned to the assignee of the present invention. That SLIC and variations of it have been widely and successfully utilized in the System 1210 electronic switching system manufactured and sold by International Telephone and Telegraph Corporation.

The Cowden SLIC includes provisions for battery boost, or range extension, applications such that the total d.c. battery potential injected into the line is increased. A combined battery and voice injection circuit is coupled to either side of the subscriber line by a resistance. For a line requiring a 900 ohm a.c. termination impedance, a 450 ohm resistor is connected to each side of the line.

SUMMARY OF THE INVENTION

In accordance with the principles of the invention, an improved SLIC circuit includes power amplifiers in the battery boost circuit which have a synthesized output impedance thereby permitting the use of lower valued battery feed resistors while still providing a predetermined a.c. impedance across a subscriber line. Further in accordance with the invention, the synthesized impedance varies with frequency from effectively zero ohms at d.c. to a predetermined value in a desired frequency range. Advantageously, the use of lower valued battery feed resistors combined with approximately zero d.c. output impedance of the power amplifiers results in a significant reduction in the d.c. power required by the line feed for a given line current. Additionally, the lower power comsumption allows higher circuit packing density. Both advantages result in lower per line circuit costs.

BRIEF DESCRIPTION OF THE DRAWINGS

The invention may be better understood from a reading of the following detailed description in conjunction with the drawings in which.

DETAILED DESCRIPTION

Figure 1:
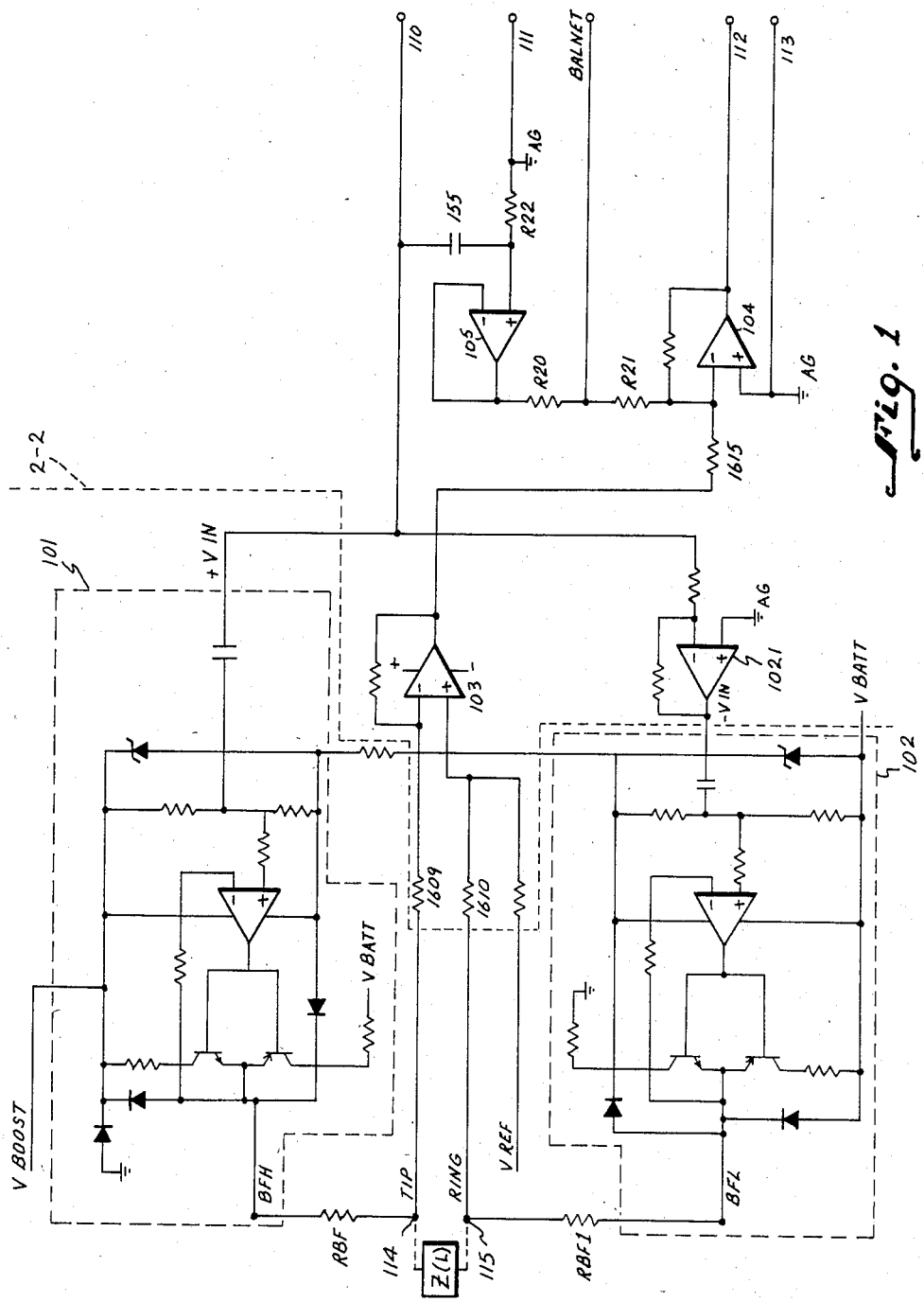
FIG. 1 illustrates a SLIC circuit to which the present invention may be advantageously applied.

The SLIC circuit of FIG. 1 is coupled to the two-wire communication path at terminals 114 and 115. The dashed lines terminated by box Z(L) represent that looking out toward the two-wire subscriber path, one "sees" an a.c. impedance of Z(L).

The four-wire communication path is coupled to the SLIC at four-wire path input terminals 110 and 111 and at four-wire output path terminals 112 and 113. Unbalanced four-wire input signals are coupled from terminal 110 to the input +VIN of amplifier 101 and are also coupled to the input of an inverting amplifier 1021. The output of inverting amplifier 1021 is coupled to the input —VIN of amplifier 102.

The output BFH of amplifier 101 is coupled via battery feed resistor RBF to one side of the two wire communication path. The output BFL of amplifier 102 is coupled via battery feed resistor RBF1 to the other side of the two-wire communication path.

The two-wire communication path also has one side coupled via resistor 1609 to the inverting input of amplifier 103 and its other side coupled via resistor 1610 to the non-inverting input of amplifier 103. The output of amplifier 103 is coupled via resistor 1615 to the inverting input of output buffer amplifier 104. The non-inverting input of amplifier 104 is coupled to ground. The output of amplifier 104 is coupled to the output portion of the four-wire path at terminal 112.

The unbalanced four-wire input signals at terminal 110 are also coupled via a capacitor 155 to the non-inverting input of a buffer amplifier 105. A resistor R22 is coupled from capacitor 155 to audio ground. The output of amplifier 105 is coupled via resistors R20 and R21 to the inverting input of output buffer amplifier 104. A transhybrid balance network BALNET is coupled to the node between resistors R20 and R21. The capacitor 155, resistor R22, and amplifier 105 serve to balance the low frequency phase shift between the balance network and that which occurs in the amplifiers 101 and 102.

The unbalanced four-wire path incoming voice signal at terminal 110 is amplified and converted to a pair of balanced signal components by the amplifiers 101 and 102 coupled to opposite sides of the two-wire path. The amplifiers 101 and 102 inject both a.c. voice signals and d.c. battery potential onto the two-wire path via the battery feed resistors RBF and RBF1.

Balanced two-wire path signals received at terminals 114 and 115 are converted for transmission to the outgoing portion of the four-wire path by coupling the two-wire path signals to the series combination of differential amplifier 103 and output buffer amplifier 104. The amplifier 105 and transhybrid balance network BALNET prevent the coupling of signals from the incoming portion of the four-wire path from reaching the outgoing portion of the four-wire path.

In the aforementioned Cowden patent, a similar structure to that shown in FIG. 1 is described. The Cowden amplifier circuits comparable to amplifiers 101 and 102 are unitary-gain feedback amplifiers with an output impedance of effectively zero ohms from d.c. to beyond the upper end of the audio frequency band of interest. These amplifiers utilize resistive feedback and do not utilize reactive feedback. For an a.c. impedance of 900 ohms looking into terminals 114 and 115 from the subscriber line, the two battery feed resistors RBF and RBF1 must each have a value of 450 ohms.

Figure 2:
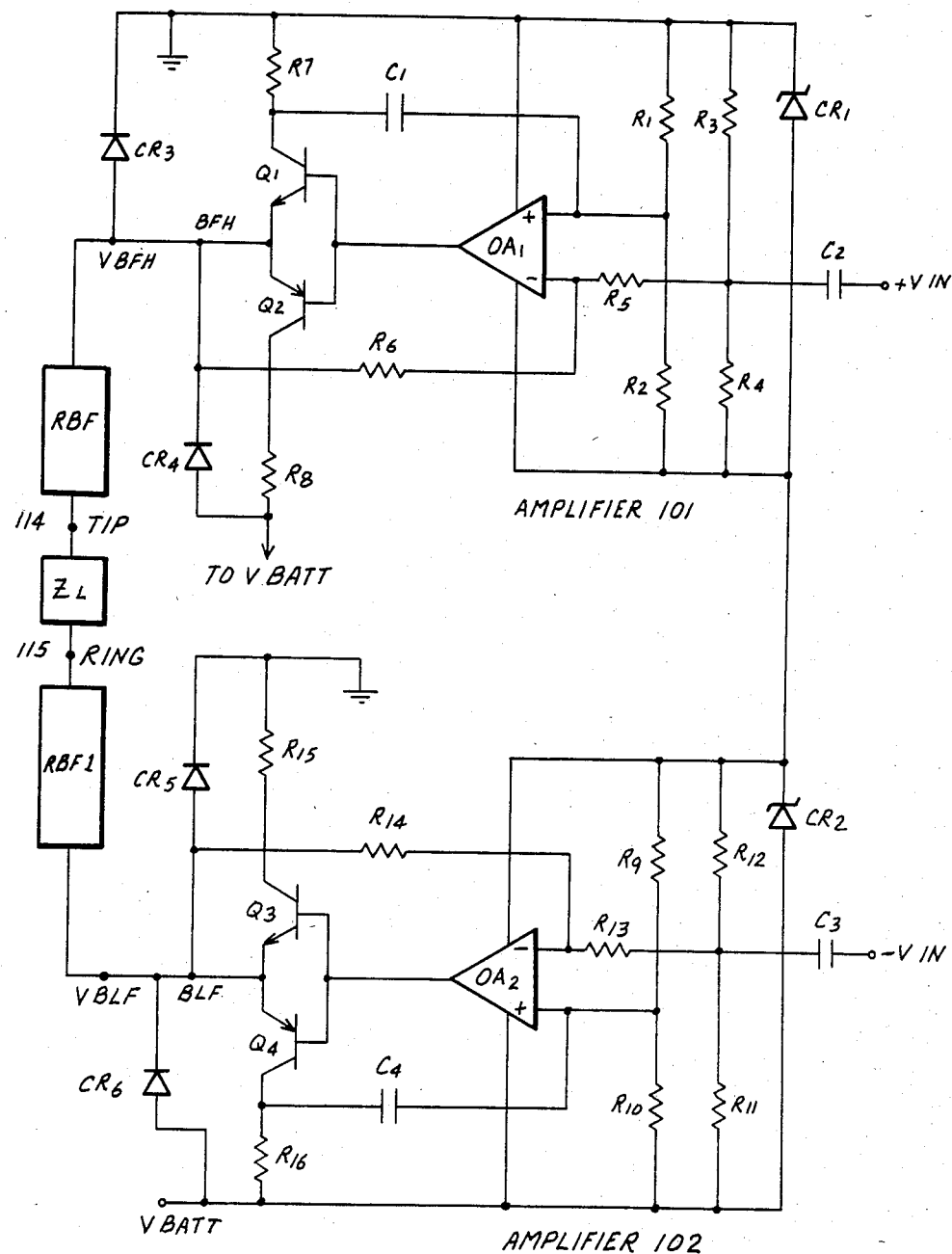
FIG. 2 illustrates in greater detail a portion of the circuit of FIG. 1 as modified by the present invention.

Turning now to FIG. 2, that portion of the circuit of FIG. 1 to the left of dotted line 2—2, as modified by the present invention, is shown in greater detail. The amplifiers 101 and 102 are identical in structure and, accordingly, in the interest of clarity and brevity only the structure of amplifier 101 will be described in detail.

Zener diodes CR1 and CR2 set the power supply voltage for the amplifiers 101, 102. Resistors R1, R2, R3, R4, R9, R10, R11 and R12 are biasing resistors for amplifiers OA1 and OA2. Transistors Q1 through Q4 provide the necessary power handling capability and are connected in a well known manner.

The input signal at the terminal +VIN is applied to the junction of resistors R3, R4, R5 and capacitor C2. Because the value of capacitor C2 is selected sufficiently large, its impedance is negligible at the frequencies of interest. The input signal is coupled to the inverting input of operational amplifier OA1 by resistor R5. The inverting input of OA1 is also connected to the output BFH via a feedback resistor R6. Thus, assuming that the non-inverting input of amplifier OA1 is held at a constant potential, the resistors R5, R6 and amplifier OA1 form an inverting feedback amplifier with a gain equal to R6/R5. Actually, the non-inverting input of amplifier OA1 is not held constant because of a second feedback signal that appears at this input. However, as is explained hereinbelow, this does not change the gain.

The second feedback signal is generated at the collector of transistor Q1 and is coupled to the non-inverting input of amplifier OA1 by capacitor C1. This is a form of current feedback because the feedback signal is generated by the current flowing in resistor R7 via transistor Q1 and is equal to the product of the current flowing through R7 multiplied by the value of resistor R7. The effect of this feedback can be determined by assuming the signal at terminal +VIN is zero and then noting that as the current flowing through Q1 and out of terminal BFH increases, the voltage at the collector of transistor Q1 goes negative. In turn, this voltage is coupled to the non-inverting input of amplifier OA1 forcing the voltage at that point negative. The signal at the non-inverting input is then amplified. Because the signal amplified is at the non-inverting input of amplifier OA1, the gain is (R5+R6)/R5. This amplified signal causes the amplifier output at BFH to go negative giving the net effect of a synthesized impedance, i.e., the output voltage decreases at the output current increases. An analysis of the circuit shows that the relationship between the output voltage and the input voltage is:

$$\frac{VBFH}{VIN} = \frac{-R6}{R5} \times \frac{(ZL/2) + RBF}{(ZL/2) + RBF + \frac{R7 \times (R5 + R6) \times R1//R2}{R5 \times (R1//R2 + XC1)}} \quad (1)$$

where (2) $R1//R2 = (R1 \times R2)/(R1+R2) = R$;

(3) $XC1 = 1/sC1$ (where s is the complex operator jw); and (4) $ZL/2 =$ The effective impedance from terminal 114 to ground contributed by the line impedance ZL when VBFL is equal to $-VBFH$.

Inspection of equation (1) shows that the amplifier circuit OA1 behaves as an amplifier with a gain equal to R6/R5 and an output impedance Z0 defined by the following equation.

$$Z0 = R7 \times \frac{(R6 + R5)}{R5} \times \frac{R1//R2}{R1//R2 + XC1} \quad (5)$$

Equation (5) can be rearranged to give:

$$Z0 = R7 \times K \times \frac{sT}{sT + 1} \quad (6)$$

where $$K = \frac{R6 + R5}{R5}, \quad (7)$$

which is the gain of the non-inverting input of amplifier OA1 to terminal BFH, and $$T = \frac{R1 \times R2 \times C1}{R1 + R2}. \quad (8)$$

Thus, the voltage at terminal VBFH may be written as $$VBFH = -VIN \times \frac{R6}{R5} \times \frac{(ZL/2 + RBF)}{(ZL/2 + RBF) + Z0} \quad (9)$$

Inspection of equation (6) shows that at low frequencies Z0 is effectively zero ohms. At higher frequencies, when sT becomes large compared to 1, Z0 equals $R7 \times K$ ohms. Thus, at low frequencies $$VBFH = -VIN \times \frac{R6}{R5}; \text{ and} \quad (10)$$

at high frequencies $$VBFH = -VIN \times \frac{R6}{R5} \times \frac{(ZL/2 + RBF)}{(ZL/2 + RBF) + (R7 \times K)} \quad (11)$$

By reason of symmetry, it can be shown that for amplifier 102 the terminal BFL has similar and complementary gain and impedance characteristics.

Thus, the total output impedance of both terminals BFH and BFL viewed in series is twice Z0. Similarly, the impedance between terminals 114 and 115 is RBF+RBF1 +(2×Z0).

The impedance between terminal 114 and ground looking into the SLIC is RBF+Z0. Choosing R7 to be 50 ohms and the quotient of R6/R5 equal to four, the mid-frequency value of Z0 is 250 ohms.

For a desired impedance between terminals 114 and 115 of 900 ohms, the impedance between each of the terminals 114, 115 and ground is 450 ohms. The battery feed resistors RBF and RBF1 are thus each 200 ohms.

It can be seen from the equations above that by varying R7, the gain R6/R5, and T that various other d.c. and a.c. impedances can be obtained. Thus, the desirable characteristics of a low d.c. impedance and a synthesized a.c. impedance are provided by the invention.

What is claimed is:

1. A circuit for coupling a two-wire transmission path to a four-wire transmission path, said circuit comprising:

a first amplifier having inputs coupled to said two-wire transmission path and an output coupled to one side of said four-wire transmission path;

first and second circuitry means for each providing combined battery and voice signal injection to said two-wire path whereby a.c. voice signals are combined with d.c. battery potential, each having an input terminal coupled to the other side of said four-wire transmission path and each having an output terminal;

a first battery feed impedance coupled between said first circuit output terminal and one side of said two-wire path;

a second battery feed impedance coupled between said second circuit output terminal and the other side of said two-wire path;

each of said first and second circuits comprising a differential input amplifier having first and second inputs and an output, a first resistor coupled between said input terminal and said first input, a first feedback impedance coupled between said output terminal and said first input:

circuit means coupling said output to said output terminal, a second resistor having one end coupled to a voltage source terminal and its other end coupled to said output terminal via said circuit means, a second feedback impedance coupled between said second resistor other end and said second input, whereby said first and second circuit means each operate to provide an output impedance at the respective said output terminal which is approximately zero for d.c. and is a predetermined non-zero value at voice frequencies.

2. A circuit in accordance with claim 1 wherein, said first feedback impedance comprises a resistance and said second feedback impedance comprises a reactive element.

3. A circuit in accordance with claim 2 wherein, said reactive element is a capacitor.

4. A circuit in accordance with claim 3 wherein each of said first and second circuit means comprises a resistive biasing network coupled to said second input, said resistive biasing network having an equivalent resistance of "R".

5. A circuit in accordance with claim 4 wherein said capacitor has a capacitance of "C" and wherein said output impedance varies in acdordance with the relationship of $$\frac{sCR}{sCR + 1}.$$

6. A circuit in accordance with claim 5 wherein said first resistor has a value of R5, said first feedback impedance has a value of R6, said second resistor has a value of R7 and said output impedance has a value of $$R7 \times \frac{(R5 + R6)}{R5} \times \frac{sCR}{sCR + 1}.$$

7. A circuit in accordance with claim 6 wherein each of said first and second circuit means has a gain equal to R6/R5.

8. A circuit for coupling a two-wire transmission path to a four-wire transmission path said circuit comprising:

first circuit means for receiving signals from said two-wire path and for transmitting corresponding signals over one side of said four-wire path, and second circuit means for receiving signals from the other side of said four-wire path and for applying corresponding signals to said two-wire path and for providing d.c. battery potential to said two-wire path, said second circuit means comprising;

a first battery feed impedance coupled at one end to one lead of said two-wire path, a second battery feed impedance coupled to the other lead of said two-wire path, a first amplifier circuit having a first input coupled to said other side of said four-wire path and an output coupled to said first battery feed impedance at its other end, said first amplifier circuit having a reactive feedback path coupled to said other end, which consists of a single reactive element, such that said first amplifier circuit has a d.c. impedance of approximately zero ohms and a predetermined non-zero impedance value at audio frequencies, and a second amplifier circuit having a first input coupled to said other side of said four-wire path and an output coupled to said second battery feed impedance.

9. A circuit in accordance wityh claim 8 wherein said second amplifier circuit includes a reactive feedback path such that said second amplifier circuit has a d.c. impedance of approximately zero ohms and a predetermined non-zero impedance value at audio frequencies.

10. A circuit in accordance with claim 9 wherein said first amplifier circuit has a second input coupled to said reactive feedback path.

11. A circuit in accordance with claim 10 wherein said first amplifier circuit includes a resistive feedback path coupled to said first input.

* * * * *